United States Patent [19]

Tohill

[11] Patent Number: 4,458,903
[45] Date of Patent: Jul. 10, 1984

[54] CONTROL LINE SEALING CONNECTION

[75] Inventor: Henry O. Tohill, Bossier City, La.

[73] Assignee: W-K-M Wellhead Systems, Inc., Shreveport, La.

[21] Appl. No.: 453,556

[22] Filed: Dec. 27, 1982

[51] Int. Cl.³ .................... F16L 33/16; F16L 39/00
[52] U.S. Cl. ............................ 277/167.5; 166/75 A; 285/137 A
[58] Field of Search ............... 166/75 A; 277/167.5; 285/137 A

[56] References Cited

U.S. PATENT DOCUMENTS

| | | | |
|---|---|---|---|
| 3,068,896 | 12/1962 | Grove | 166/75 A |
| 3,166,345 | 1/1965 | Pinkard | 285/137 A |
| 3,248,130 | 4/1966 | Knight | 285/137 A |
| 3,451,481 | 6/1969 | Lanmon | 285/137 A |
| 3,479,063 | 11/1969 | Raver | 277/167.5 |
| 3,594,022 | 7/1971 | Woodson | 277/167.5 |
| 4,077,472 | 3/1978 | Gano | 166/75 A |
| 4,229,027 | 10/1980 | Morrill | 285/137 A |
| 4,384,728 | 5/1983 | Koltookian | 277/167.5 |
| 4,418,923 | 12/1983 | Halabya | 277/167.5 |

*Primary Examiner*—Robert I. Smith
*Attorney, Agent, or Firm*—Marvin J. Marnock

[57] ABSTRACT

A sealing connection for the passage of a fluid control line through adjoining members. The connection comprises a metallic tubular sealing element (10) provided with tapered end portions, each end having internal frusto-conical surfaces (32, 33) and external frusto-conical surfaces (41,43) in coaxial alignment with the bore (31) through the element (10). The external frusto-conical surfaces (41, 43) provide metal-to-metal sealing with aligned frusto-conical seating surfaces (62, 54) in opposed pockets (51, 61) formed in aligned portions (28a, 29) of the control line at their respective openings at the adjoining surfaces of the adjoined member (13, 12). The tubular sealing element (10) is subjected to axial compression between the frusto-conical pocket seating surfaces (62, 54) when the adjoined members (13, 12) are bolted tightly together which results in deformation of its tapered end portions to provide metal-to-metal sealing with the adjoined members (13, 12) which is effective to seal against both internal and external fluid pressurization of the control line and without internally obstructing or restricting the control line. Secondary sealing is provided by elastomeric O-ring seals (36, 39) mounted in circumferential annular grooves formed in the exterior of the tubular sealing element (10).

5 Claims, 4 Drawing Figures

CONTROL LINE SEALING CONNECTION

BACKGROUND OF THE INVENTION

This invention relates to high pressure sealing joints and more particularly to a seal assembly for sealing a fluid control line connection between coaxially aligned flow passages in adjoining members, such as between a tubing hanger and a tubing head adapter in a wellhead.

There is a variety of downhole tools and devices employed in well operations which rely on fluid control lines for their operation. For example, one of the primary means of preventing blowouts in producing wells is by the use of surface controlled subsurface safety valves. These valves are normally set several hundred feet below the surface in the tubing string and can be either wireline or tubing retrievable types. These downhole safety valves require the installation of hydraulic control lines for opening and closing operations. This invention relates to a seal assembly in an installation for bringing control line fluid pressure from the surface controls through the tubing head adapter and the tubing hanger for coupling to the control line which extends downwardly to a connection on the downhole device such as a subsurface safety valve. Heretofore, sealing has been accomplished in the passage between the tubing hanger and tubing head adapter by means of seals which rely primarily on elastomeric sealing elements. These are generally inadequate under high pressure and high temperature conditions and in critical service hydrogen sulfide or carbon dioxide environments. Some seals are pressure energized as determined by their design and relationship with the elements which are connected, but these generally rely on internal pressurization. In the application of sealing the control line passage between the tubing head adapter and the tubing hanger it is important that a fluid-tight seal be achieved whether fluid pressure be applied from the interior or the exterior of the joint.

The present invention has, as its primary object, the provision of a seal assembly for sealing the passage in a fluid control line connection between a tubing head adapter and a tubing hanger under high pressure and high temperature conditions and in critical service corrosive environments.

Another object is to provide a seal assembly for sealing the passage of a pneumatic or hydraulic control line through a tubing head adapter and a tubing hanger by means of a metallic tubular sealing element having tapered frusto-conical end portions which are receivable in opposed pockets formed in aligned adjoining flow passages in the tubing head adapter and tubing hanger and which are subject to deformation to effect metal-to-metal seals with frusto-conical seating surfaces in the opposed pockets when the tubular sealing element is subjected to an axial compression by bolting together of the tubing head adapter and the tubing hanger.

SUMMARY OF THE INVENTION

The invention provides means for sealing the passage of a fluid control line through adjoining members such as a tubing head adapter and a tubing hanger. The invention comprises a metallic tubular sealing element which is receivable in opposed pockets in the aligned passages of the control line through the adjoining members. The tubular sealing element 10 is provided with tapered end portions with both internal and external frusto-conical surfaces at each end in coaxial alignment with the bore through the tubular sealing element. The external frusto-conical surfaces provide metal-to-metal sealing with aligned frusto-conical sealing surfaces in the opposed pockets when the adjoined members are bolted together. The axial dimension of the tubular sealing element between its frusto-conical tapered end portions is less than that between the opposed frusto-conical seating surfaces of the pockets. Accordingly, when the tubular sealing element is installed with one tapered end in seating engagement with the frusto-conical seating surface in one of said adjoining members and its other tapered end is in seating engagement with the frusto-conical seating surface in the pocket of the other adjoining member, an axial compressive force is applied to the tubular sealing element when the adjoining members are drawn tightly together as by bolting or by the weight of apparatus mounted atop one of the adjoining members. A deformation of the metallic tubular sealing element occurs at its tapered end portions which provide a metal-to-metal seal with the adjoining members which is effective against internal or external pressures. Resilient elastomeric seals are also provided on the exterior of the tubular sealing element to provide a secondary seal.

BRIEF DESCRIPTION OF THE DRAWINGS

Referring to the drawings in greater detail, the tubular sealing element 10 of the sealing connection of this invention is shown in FIG. 1 in a wellhead installation where it seals the passage of a hydraulic control line between a tubing hanger 12 and a tubing head adapter 13. FIG. 1 is a fragmentary view of a typical wellhead assembly showing a tubing head 15 in which the tubing hanger 12 is mounted and supported on an upward facing shoulder 16 formed in the bore 18 of the tubing head. The adapter 13 is mounted atop the tubing head 15 and bolted thereto by a plurality of bolts 14 with its central axial bore 17 in alignment with the bore 18 of the tubing head. The bolts 14 extend through the head flange 20 from the underside thereof into accommodating threaded bores provided in the underside of the adapter 13.

Figure 1:
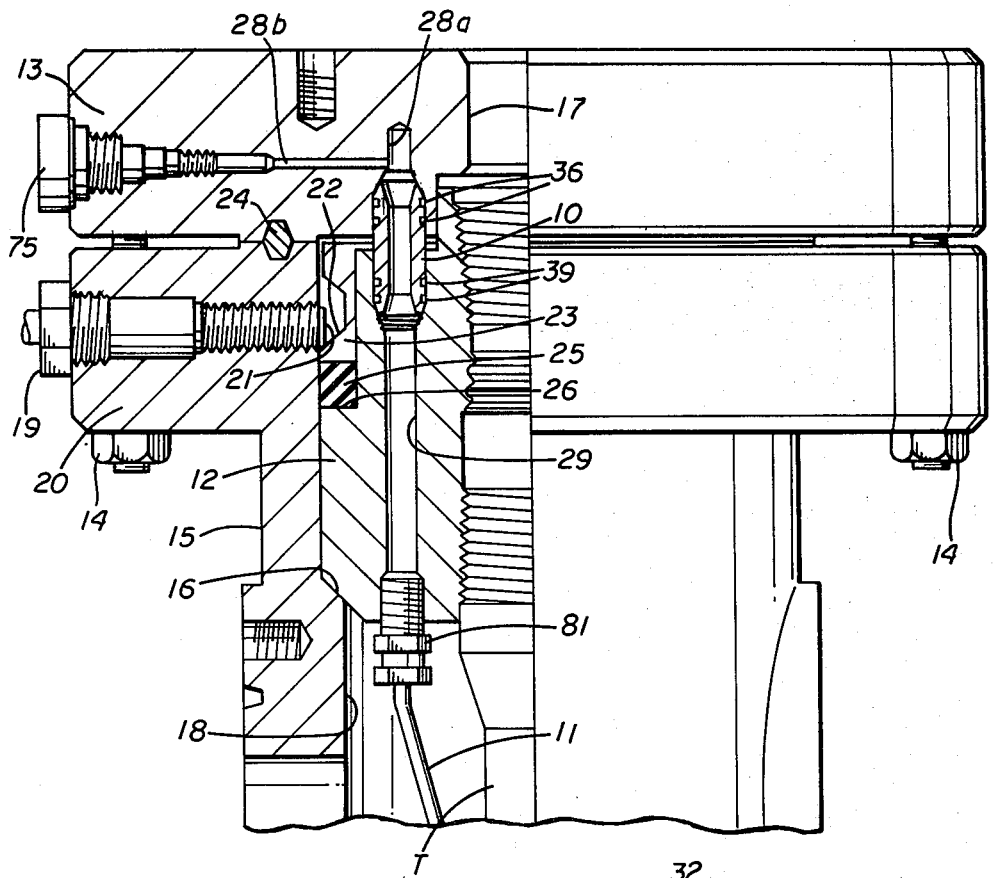
FIG. 1 is a view, partly in section, showing the seal assembly of this invention as installed for sealing a control line connection between coaxially aligned flow passages in a tubing hanger and tubing head adapter.

Between the tubing head 15 and the tubing head adapter 13, a conventional metal gasket 24 is installed. In typical fashion, the gasket 24 is seated in opposed annular grooves which are formed in the underside of the adapter 13 and the top of the tubing head 15 in encircling relation to their respective axial bores to provide a metal-to-metal sealing connection for the adapter 13 and the tubing head 15.

Also, the tubing hanger 12 is secured within the tubing head 15 by a plurality of holddown screws 19 which are circumferentially spaced about the tubing head flange 20 and extend radially inwardly from the exterior of the flange 20 into the bore thereof. The tips 21 of the holddown screws 19 engage the upward facing frusto-conical shoulder 22 of an annular groove which is provided in the exterior of a top adapter ring 23 which is sleeved around the reduced diameter portion of the upper end of the hanger 12. As the screws 19 are threaded inward, their tips cam the top adapter ring 23 downwardly to compress an annular rubber seal 25 which is supported on the upward facing annular shoulder 26 of the hanger 12 and at the same time apply a force to hold the hanger 12 against the landing shoulder 16 in the tubing head bore.

The tubing hanger 12 provides means for suspending a tubing string T or a plurality of strings in the well bore. Since some installations require a fluid control line from a source of pressurized fluid at the top of the well to a downhole mechanism disposed within the well, it becomes necessary to provide a longitudinal passage which extends through the body of the tubing hanger to accommodate the fluid control line. The conduit 11, shown in FIG. 1, is part of a hydraulic control line which leads to a downhole device, such as, for example, an actuator for a subsurface safety valve which is normally set several hundred feet below the surface in the tubing string T and relies on hydraulic controls for opening and closing the valve. At the surface, hydraulic fluid is supplied to the conduit 11 through a needle valve 75 which is installed in a threaded bore in the side of the adapter 13 and communicates with the conduit 11 by means of passages 28b and 28a in the adapter 13, the tubular sealing element 10 of this invention, and the vertical passage 29 which is provided in the hanger 16. A threaded connector 81 connects the conduit 11 into a threaded tap or socket at the bottom end of the passage 29. For pressures greater than 10,000 psi, an external autoclave control fitting may be used in lieu of the internal needle valve 75.

With such control lines, it is, of course, essential that fluid-tight sealing be accomplished in the passage between the tubing hanger and the tubing head adapter. The sealing connection of this invention is particularly suited for providing fluid-tight sealing under extremely high well pressures and temperatures and in high corrosive environments.

Figure 2:
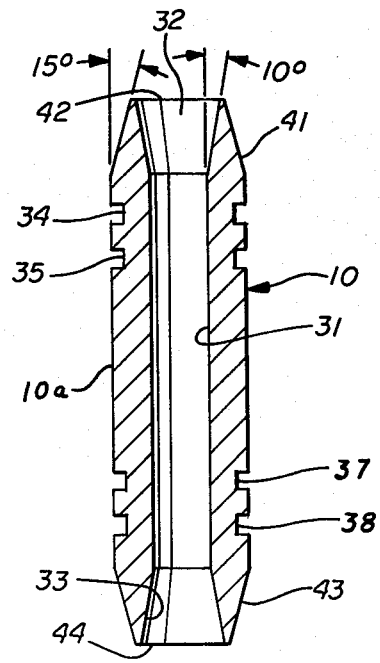
FIG. 2 is an enlarged cross-sectional view of the metallic tubular sealing element in the sealing assembly of the invention.

The sealing connection of this invention comprises a metallic tubular sealing element 10 which is shown in sectional view in detail in FIG. 2. The tubular sealing element 10 which is fabricated of metallic material, such as 316 stainless steel, is provided with an axial bore 31 which extends therethrough and is provided with enlarged bore sections at its upper and lower ends as defind by internal frusto-conical surfaces 32, 33, respectively. These interior frusto-conical surfaces 32, 33 are each provided with a taper angle of 10° corresponding to a cone angle of 20° and flare outwardly to a diameter at the ends of the element 10 which is slightly larger than the diameters of the passages 28a and 29 in the adapter 13 and hanger 12, respectively.

On its exterior, the tubular sealing element 10 is provided with an exterior cylindrical surface 10a which extends throughout its length except for its end portions which are defined by external frusto-conical surfaces 41 and 43 at its upper and lower ends, respectively. The surfaces 41 and 43 are each provided with an angle of taper of 15° and are convergent towards the respective upper and lower ends 42, 44 of the sealing element 10. In axial dimension, the surfaces 41, 43 are equal to the axial dimensions of the internal frusto-conical surfaces 32, 33.

In its exterior cylindrical surface, the sealing element 10 is also provided with a pair of circumferential annular grooves 34, 35 located just below the tapered surface 41 at its upper end portion for accommodating a pair of O-rings 36 therein. A similar pair of circumferential annular grooves 37, 38 is provided in its exterior cylindrical surface just above the tapered surface 43 at its lower end. The grooves 37, 38 are adapted to receieve a pair of O-rings 39 therein.

To accommodate the tubular metallic sealing element 10, the vertical passage 29 in the portion of the hydraulic control line which extends through the tubing hanger 12 is enlarged at the end thereof which opens at the top of the tubing hanger 12 to provide a pocket 51. The pocket 51 is of a size and configuration to receive substantially all of the lower half of the tubular sealing element 10 in a snug close-fitting relation therein, as might be provided by a clearance of 0.005 inches. In similar fashion, the vertical passage 28a in the portion of the hydraulic control line which is formed through the tubing adapter 13 is enlarged at the open end thereof at the underside of the adapter 13 to provide a pocket 61. The pocket 61 is of a size and configuration to receive substantially all of the upper half of the tubular sealing element 10 in a snug, close-fitting relation therein with a clearance of approximately 0.005 inches.

Figure 3:
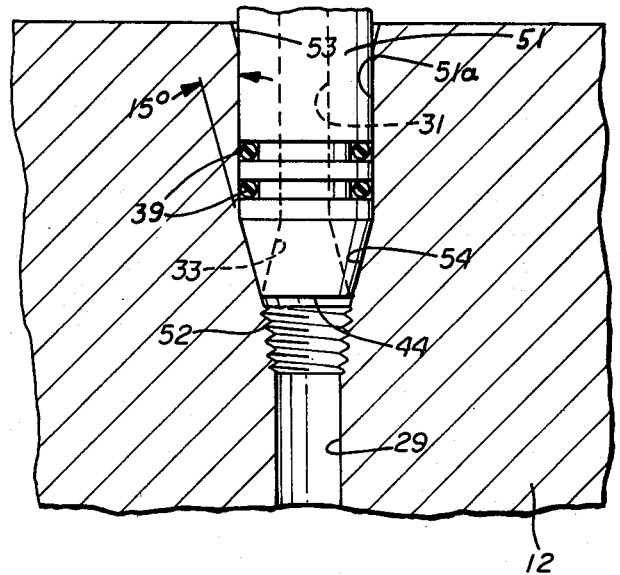
FIG. 3 is a fragmentary sectional view of the tubing hanger in the installation of FIG. 1 which is shown with a pocket provided therein for receiving the lower portion of the tubular sealing element of FIG. 2 which is shown in phantom lines therein with the tubular sealing element shown in the condition of effecting a fluid-tight seal with the tubing hanger.

As best shown in FIG. 3, it will be seen that the pocket 51 in the hanger 12 is of generally circular cross-section throughout its length and communicates with control line passage 29 via an intermediate threaded bore section 52. The threaded section 52 is designed to temporarily receive a threaded nipple which is part of a system used in pumping hydraulic fluid through the control line 11 to open the downhole safety valve while landing the tubing hanger 12 into the tubing head 15 and for the testing of downhole systems for fluid-tight integrity. Such testing typically is done prior to the installation of the adapter 13 atop the tubing head 15. After the hanger is landed and testing successfully accomplished, the temporary nipple is removed and the tubing head adapter 13 may then be mounted atop the tubing head 15.

Immediately above the threaded section 52, the pocket 51 is provided with a tapering bore section 54 which is of narrowest diameter at its communication connection with the threaded section 52. The tapering pocket section 54 diverges upwardly to its largest diameter at its opening in communication with the elongate cylindrical section 51a of the pocket 51 which is of corresponding diameter. The tapering pocket section 54 is defined by a frusto-conical surface with an angle of taper of 15° which corresponds with that of the lower tapered end surface 43 of the sealing element 10. Also, the diameter of the elongate cylindrical section 51a of the pocket 51 is only very slightly larger than the external diameter of the cylindrical section 10a of the tubular sealing element 10 such that there is a very snug fit of the tubular sealing element 10 with the pocket 51 when the sealing element 10 is fully seated in the pocket 51 with its tapered end surface 43 in seated engagement with the conical seating surface 54.

The pocket 51 at the end thereof which opens at the top of the hanger 12 is provided with a bevelled surface 53 which facilitates entry of the tubular sealing element 12 into the pocket 51 when the O-rings 39 are attached so that the O-rings are not damaged or extruded during its entry into the pocket. The operational relationship of the tubular sealing element 10 with the pocket 51 and the hanger 12 is illustrated in FIG. 3 which shows the location of the O-rings 36 with respect to the bore wall of the pocket 51. The O-rings 36 provide secondary sealing as a back-up to the metal-to-metal sealing provided by the lower tapered end of the sealing element 10 and the conical seating surface 54 of the pocket 51 in a manner to be hereinafter described.

Figure 4:
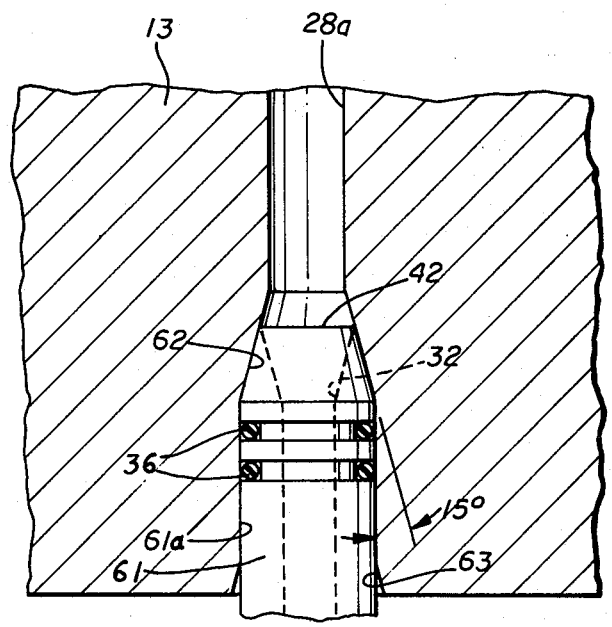
FIG. 4 is a fragmentary sectional view of the tubing head adapter in the installation of FIG. 1 showing a pocket therein for receiving the upper portion of the tubular sealing element of FIG. 2 with the tubular sealing element shown in the condition of effecting a fluid-tight seal with the tubing head adapter.

As shown in FIG. 3, only the lower half of the tubular sealing element 10 can be accommodated by the pocket 51. The top half of the tubular sealing element 10 is adapted to be received in a pocket 61 which is provided in the lower end of the vertical passage 28a in the adapter 13. As best shown in FIG. 4, the pocket 61 includes a bevelled frusto-conical surface 63 at the mouth of the pocket which opens in the underside of adapter 13, an elongate cylindrical bore section 61a in coaxial alignment with the bevelled surface 63, and a frusto-conical seating surface 62 at the upper end of the pocket 61. The diameter of the cylindricl section 61a is only slightly larger than the diameter of the cylindrical section 10a of the tubular sealing element 10 so that the tubular sealing element 10 will fit snugly therein. As previously stated a clearance of 0.005 inches is appropriate. The taper of the frusto-conical seating surface 62 is exactly equal to the taper of the upper end surface 41 of the sealing element 10.

In the embodiment of the invention shown in FIGS. 3 and 4, the length of the cylindrical section 10a of the sealing element 10 slightly exceeds the total axial dimensions of the elongate cylindrical pocket sections 61a and 51a including those of the bevelled pocket surfaces 63 and 53. Accordingly, when the tubular sealing element 10 is installed in the control line between the adapter 13 and tubing hanger 12 as shown in FIG. 1, the tapered conical end surfaces 41, 43 of the sealing element 10 will seat against the frusto-conical seating surfaces 62 and 54 of the upper and lower pockets, respectively. The tubular sealing element 10 is therefore subject to axially directed compression forces applied by the weight of the adapter 13 and the wellhead components mounted thereupon as well as the forces applied which result from torque applied to the bolts 14 to draw the adapter into tight sealing engagement with the tubing head 15.

The resulting axial compression of the tubular sealing element 10 results in some deformation of its tapered ends such that the diameters of the open ends of the tubular sealing element 10 are slightly narrowed and the engagement of its tapered ends with the conical seating surfaces 62 and 54 of the pockets 61 and 51 is extended towards the narrow ends of the seating surfaces. The deformation and compression of the tubular sealing element 10 results in a metal-to-metal sealing relationship with the adapter 13 and the tubing hanger 12 such that the control line through the adapter 13 and hanger 12 is effectively sealed against fluid pressure within the control line itself as well as from well pressures which may be present in the annulus between the tubing string T and the tubing head bore.

It is also to be noted that the outward flare of the internal tapered surfaces of the sealing element 10 provides for an opening at its ends which is slightly larger than the bore of the connecting passageways 29 and 28a. As the seal is compressed, its tapered ends are flexed inwardly to substantially align its inner conical surfaces with the bores of the aligned passages without restricting or obstructing the same.

While the metal-to-metal sealing is particularly suited for high temperature and high pressure environments, for example, in the range of 5,000 psi to 30,000 psi, it will also seal at low pressures and in corrosive environments. The O-rings 36 and 39, which are of rubber or other elastomeric material, are provided as a back-up seal for the metal-to-metal seals, particularly for operations in the lower pressure ranges.

It is to be understood that the foregoing description of a preferred embodiment of the invention has been presented for purposes of illustration and description and is not intended to limit the invention to the precise form disclosed. For example, the taper of the external frusto-conical surfaces of the tubular sealing element 10 has been shown as 15° but a taper in the range of 10° to 20° is acceptable, depending on the particular application. Similarly, while the taper angle of the internal frusto-conical surfaces of the tubular sealing element 10 has been illustrated as 10°, an angle of taper in the range of 5° to 15° would serve as well. Furthermore, while the invention has been illustrated as a sealing connection for a fluid control line passage between a tubing head adapter and a tubing hanger, it could be used as a sealing connection for a passage between other wellhead components or any other adjoining members and particularly so where there is a possibility that the connection could be subjected to external fluid pressurization as well as internal fluid pressure. It is to be appreciated, therefore, that changes may be made by those skilled in the art to best suit the particular use contemplated without departing from the spirit of the invention.

What is claimed is:

1. Sealing assembly for sealing the passage of a fluid control line between the adjoining surfaces of connected first and second members, such as a tubing head adapter and a tubing hanger in a wellhead, each said first and second connected member being provided with a flow passageway constituting a part of said fluid control line and disposed in alignment with one another;

each said flow passageway in each said connected member being provided with an enlargement thereof which forms a pocket opening at the adjoining surface of said connected member and disposed in opposed relation to the other of said pockets; and each said pocket having an elongate bore section of circular cross-section extending from the adjoining surface to its pocket bottom end portion which is defined by a frusto-conical seating surface disposed in coaxial alignment with the elongate bore section and tapering inwardly to the bottom end of the pocket opening to its associated flow passageway;

a metallic tubular sealing element adapted to be received in said passageways for establishing fluid communication therebetween and for sealing the passage of the control line through said connected adjoining members;

said tubular sealing element having a longitudinal bore of circular cross-section extending therethrough with the longitudinal bore being defined by internal frusto-conical surfaces at its respective end portions and a generally cylindrical bore section intermediate its internal frusto-conical surfaces, each said internal frusto-conical surface flaring outwardly from the intermediate cylindrical bore section to an associated end of the tubular sealing element;

said tubular sealing element having an external surface with tapered end portions and a generally cylindrical surface section of circular cross-sectional configuration intermediate the tapered end portions, each said tapered end portion being defined by an external frusto-conical surface which tapers from the generally cylindrical intermediate section of its external surface in an axially inward direction to a respective end of the tubular sealing element;

said tubular sealing element having an axial dimension between its external frusto-conical surfaces at the tapered ends thereof which exceeds the total axial dimensions of the pockets intermediate their frusto-conical seating surfaces when the pockets are disposed in coaxial alignment whereby the tapered ends of said metallic tubular sealing element are in seated engagement with the frusto-conical seating surfaces in said pockets and subject to being flexed and deformed in an axially inward direction to provide fluid-tight metal-to-metal annular seals with said pockets and thereby seal the passage of the fluid control line through said connected first and second members.

2. A sealing assembly as described in claim 1 wherein each said external frusto-conical surface of the metallic tubular sealing element is provided with an angle of taper which is identicaly equal to the angle of taper of the frusto-conical seating surface with which it is engaged.

3. A sealing assembly as described in claim 2 wherein the angle of taper of each said external frusto-conical surface of the metallic tubular sealing element is in the range of 10° to 20° and the angle of taper of each said internal frusto-conical surface in the bore of the metallic tubular sealing element is in the range of 5° to 15°.

4. A sealing assembly as described in claim 1 wherein said metallic tubular sealing element is provided with at least one circumferential groove in its external cylindrical surface section adjacent each of its tapered end portions, and a resilient O-ring mounted in each circumferential groove for establishing secondary fluid-tight seals with said first and second connected members.

5. A sealing assembly as described in claim 2 further including at least one annular resilient sealing means disposed around the cylindrical exterior of the tubular sealing element adjacent each tapered end portion thereof for establishing secondary fluid-tight seals with said first and second connected members.

* * * * *